United States Patent
He et al.

(10) Patent No.: US 12,501,019 B2
(45) Date of Patent: Dec. 16, 2025

(54) FLICKER-FREE DIRECTIONAL BACKLIGHT NAKED-EYE 3D DISPLAY DEVICE FOR MULTI-PERSON VIEWING

(71) Applicant: Guangzhou Mid Technology Co., Ltd., Guangdong (CN)

(72) Inventors: Yong He, Guangdong (CN); Jianying Zhou, Guangdong (CN); Xuehao Chen, Guangdong (CN); Mengyi Cheng, Guangdong (CN); Zhanhong Li, Guangdong (CN); Yunjia Fan, Guangdong (CN); Xiaoke Li, Guangdong (CN); Juan Ding, Guangdong (CN); Dongyan Deng, Guangdong (CN)

(73) Assignee: Guangzhou Mid Technology Co., Ltd., Guangdong (CN)

( * ) Notice: Subject to any disclaimer, the term of this patent is extended or adjusted under 35 U.S.C. 154(b) by 0 days.

(21) Appl. No.: 18/900,881

(22) Filed: Sep. 29, 2024

(65) Prior Publication Data
US 2025/0024012 A1    Jan. 16, 2025

Related U.S. Application Data

(63) Continuation of application No. PCT/CN2022/093140, filed on May 16, 2022.

(30) Foreign Application Priority Data

Apr. 18, 2022    (CN) .......................... 202210404449.9

(51) Int. Cl.
H04N 13/32     (2018.01)
H04N 13/144    (2018.01)
(Continued)

(52) U.S. Cl.
CPC .......... *H04N 13/32* (2018.05); *H04N 13/144* (2018.05); *H04N 13/346* (2018.05); *H04N 13/383* (2018.05)

(58) Field of Classification Search
CPC .... H04N 13/32; H04N 13/383; H04N 13/114; H04N 13/346
(Continued)

(56) References Cited

U.S. PATENT DOCUMENTS

2018/0031852 A1* 2/2018 Zhou ..................... H04N 13/305
2022/0400245 A1* 12/2022 Perreault ................ G02B 30/27

FOREIGN PATENT DOCUMENTS

CN     105527720     4/2016
CN     108630154     10/2018
(Continued)

OTHER PUBLICATIONS

"International Search Report (Form PCT/ISA/210) of PCT/CN2022/093140," mailed on Dec. 1, 2022, with English translation thereof, pp. 1-4.

*Primary Examiner* — Joseph G Ustaris
(74) *Attorney, Agent, or Firm* — JCIPRNET

(57) ABSTRACT

The present invention relates to the technical field of naked-eye 3D display, and provides a flicker-free directional backlight naked-eye 3D display device for multi-person viewing. An image control module converts image data into a 3D image, and a parallax 3D image is output to a first or $N^{th}$ viewer through the cooperation of a display unit, a triangular prism-shaped microstructural directional beam-splitting film, and a directional backlight module, a quantity of viewers is determined by a human eye position signal in a display area collected by a human eye tracking module. The directional backlight module provides motion parallax, and the triangular prism-shaped microstructural directional beam-splitting film provides binocular parallax, so that the
(Continued)

resolution is lost by only half in a horizontal direction and remains unchanged in a vertical direction, so that ultra HD 3D images can be implemented for one or more persons.

8 Claims, 5 Drawing Sheets

(51) Int. Cl.
    *H04N 13/346* (2018.01)
    *H04N 13/383* (2018.01)
(58) Field of Classification Search
    USPC .......................................................... 348/51
    See application file for complete search history.

(56) References Cited

FOREIGN PATENT DOCUMENTS

| | | | | | |
|---|---|---|---|---|---|
| CN | 108630154 | A | * | 10/2018 | ............. G02B 30/27 |
| CN | 112946912 | | | 6/2021 | |
| CN | 112946912 | A | * | 6/2021 | ............. G02B 30/33 |
| CN | 114326142 | | | 4/2022 | |
| WO | WO-2017114839 | A1 | * | 7/2017 | ........... H04N 13/398 |
| WO | 2021178397 | | | 9/2021 | |

* cited by examiner

FLICKER-FREE DIRECTIONAL BACKLIGHT NAKED-EYE 3D DISPLAY DEVICE FOR MULTI-PERSON VIEWING

CROSS-REFERENCE TO RELATED APPLICATIONS

This application is a continuation of international PCT application serial no. PCT/CN2022/093140, filed on May 16, 2022, which claims the priority benefit of China application no. 202210404449.9, filed on Apr. 18, 2022. The entirety of each of the above-mentioned patent applications is hereby incorporated by reference herein and made a part of this specification.

TECHNICAL FIELD

The present invention relates to the technical field of naked-eye 3D display, and in particular to a flicker-free directional backlight naked-eye 3D display device for multi-person viewing.

BACKGROUND

The naked-eye 3D display technology is widely used in education, commerce, medical, and other fields, and can provide humans with good 3D visual experience, but it still has some defects, such as resolution loss, high crosstalk, and less pop out of the screen. With the popularization of 4K and 8K liquid crystal panels, the resolution after loss in 3D mode can still meet people's needs. What remains unsolved are difficulties such as pixel-level calibration between gratings or lenticular lenses and LCD panels and high crosstalk in the process of mass production and popularization.

A directional backlight naked-eye 3D technology implements presentation of 3D images without resolution loss by using a technology with separate image sources and light sources, resolving a problem of the resolution loss, is compatible with various 3D movies and 3D games on the market, and also preventing a reverse vision phenomenon (i.e., the left eye perceives the right-eye image, and the right eye perceives the left-eye image), of a traditional 3D technology, and is mainly composed of optical devices such as a directional backlight source, a lens array, an image display layer, a linear diffusion sheet, and the like. The image display device is mainly a liquid crystal panel with a refresh rate of 120 Hz or 240 Hz. When a left-eye image is refreshed, an LED corresponding to a left eye is turned on. When a right-eye image is refreshed, an LED corresponding to a right eye is turned on, and no screen flickering occurs because of refresh rate >60 Hz per eye. In addition, a lens at a pixel level is not required to be matched with the LCD, and processing is easily performed. However, there are still some drawbacks such as that a 3D image with high display quality is experienced at only one optimum viewing distance limited by a focal length of the lens, that is, a longitudinal viewing distance is limited, moreover, this technology receives much attention due to a quantity of viewers, flickering, backlight determining corresponding to a viewing zone, edge brightness degradation caused by a wide viewing zone, and contradiction between a crosstalk value and uniformity.

In the prior art, a lossless ultra-high-definition (ultra HD) naked-eye 3D display device for simultaneous multi-person viewing is disclosed. An image output module converts image data into a 3D image in a corresponding format, a directional backlight module is connected to a display output module, the directional backlight module includes a plurality of U-shaped backlight units, and each unit includes a plurality of LED light bars with different spacings from the lens. LED light bar combinations in different backlight units can illuminate an entire display range, and the display module and the backlight units are controlled synchronously. A 3D image corresponding to a left eye or right eye is output to a first viewer or a second viewer through the display module, and a backlight unit corresponding to the left eye or the right eye of the first viewer or the second viewer is turned on simultaneously. Under the action of the lens, free 3D images without resolution loss can be viewed simultaneously without additional assistance for one or more persons, and even different experiencers can see free 3D images in different pictures. Unavoidable static and dynamic flicker intensities under horizontal and longitudinal movement by means or dense viewing zone is concentrated and a viewing zone is adjusted in real-time, but its image source and light source are not separated, and it has a high crosstalk. In addition, longitudinal display resolution is reduced in a case of multi-person viewing, which cannot implement high-quality naked-eye 3D display quality for multi-person viewing.

SUMMARY

To solve problems of high crosstalk and great resolution loss in a naked-eye 3D display device for multi-person viewing, the present invention provides a flicker-free directional backlight naked-eye 3D display device for multi-person viewing, which reduces a display data bandwidth and switching flicker, and display resolution is lost only by half in a horizontal direction and remains unchanged in a vertical direction, so that ultra HD 3D images can be achieved for one or more persons.

To achieve the above technical effect, technical solutions of the present invention are as follows:

a flicker-free directional backlight naked-eye 3D display device for multi-person viewing, including: an image control module, a human eye tracking module, a directional backlight module, a light shaping film layer, a display unit, a triangular prism-shaped microstructural directional beam-splitting film, where the triangular prism-shaped microstructural directional beam-splitting film covers and is pasted on the display unit; the image control module converts image data into a 3D image, and the image control module is connected to the directional backlight module, the human eye tracking module, and the display unit respectively, extracts a human eye position signal collected by the human eye tracking module, synchronously sends the human eye position signal to the directional backlight module, and controls display output of the display unit; and the directional backlight module includes several backlight units, a light beam emitted by each backlight unit is shaped into a directional light beam by the light shaping film layer, the directional light beam loads an image through the display unit and are split through the triangular prism-shaped microstructural directional beam-splitting film, the 3D images displayed by the display unit includes a left-eye parallax image and a right-eye parallax image, and odd columns and even columns of the display unit display the left-eye parallax image and the right-eye parallax image respectively, the triangular prism-shaped microstructural directional beam-splitting film is composed of several triangular prism array units, each triangular prism array unit is corresponding to two columns of pixels and covers both a left-eye parallax image display pixel and a right-eye parallax image display pixel, and the 3D images displayed by the display unit are projected through the triangular prism-shaped microstructural directional beam-splitting film and then incident into left and right pupils of different viewers.

In the technical solutions, the image control module converts image data into a 3D image in a corresponding format, and a parallax 3D image is output to a first or $N^{th}$ viewer through the cooperation of the display unit, the triangular prism-shaped microstructural directional beam-splitting film, and the directional backlight module. When a plurality of persons view the 3D images, a quantity of viewers is determined by a human eye position signal in a display area collected by a human eye tracking module. The directional backlight module only needs to correspondingly increase a quantity of backlight units to be turned on with the increase of the quantity of viewers, without the need for an additional optical device, thus simplifying the naked-eye 3D display device. The directional backlight module provides motion parallax, and the triangular prism-shaped microstructural directional beam-splitting film provides binocular parallax, so that the resolution is lost by only half in a horizontal direction and remains unchanged in a vertical direction, and ultra HD 3D images can be implemented for one or more persons, and an liquid crystal screen with a high-refresh rate is not required to perform parallax image display with time-division multiplexing, reducing a display data bandwidth and switching flicker, and implementing high-quality naked-eye 3D display with low crosstalk for multi-person viewing.

Preferably, the display unit is an LCD panel.

Preferably, the 3D images displayed and output by the LCD panel are formed by interleaving and fusing odd columns and even columns of left-eye parallax images and right-eye parallax images.

Preferably, a screen refresh rate of the display unit is greater than or equal to 60 Hz, and a display unit with a high refresh rate is not required, which reduces a refresh rate requirement and reduces device costs.

Preferably, the width of each pixel of the display unit is set to P, the section height of a triangular prism in the triangular prism-shaped microstructural directional beam-splitting film is set to h, an interpupillary distance of any one of a plurality of viewers is set to S, a refractive index of a material of the triangular prism is set to n1, and an optimal viewing distance is set to L, so that a geometrical optical relationship among the section height h of the triangular prism in the triangular prism-shaped microstructural directional beam-splitting film, the width P of each pixel of the display unit, the interpupillary distance S of any one of the plurality of viewers, and the optimal viewing distance L is as follows:

$$\arctan\left(\frac{L-\frac{h}{2}}{\frac{P+S}{2}}\right) - \arctan\left(\frac{h}{P}\right) = \frac{\pi}{2} - \arcsin\left[n1 \cdot \sin\left(\arctan\left(\frac{h}{P}\right)\right)\right].$$

Preferably, the light shaping film layer is composed of a lens array film and a linear diffusion film, and a lens array of the lens array film is a linear fresnel lens array.

Preferably, each backlight unit is composed of a plurality of LED light bars with different spacings from the light shaping film layer, the LED light bars are combined to form a polygonal structure, the polygon is formed by fitting a free curve of a focal plane of a lens unit, and an entire display area in which the viewer is located is illuminated by LED light bar combinations in different backlight units.

The polygonal structure formed by the LED light bar combinations is more approximate to a real focal plane shape of a lens, and the entire display area in which the viewer is located is illuminated by the LED light bar combinations in different backlight units. When a quantity of viewers is increased, only the LED light bar combinations that are turned on in the backlight units are needed to be increased and synchronously tracked, so that resolution loss obtained when one or more persons experience is reduced, and generated crosstalk is also reduced.

Preferably, the human eye tracking module includes a binocular infrared camera and an infrared light supplementing light assisting the binocular infrared camera. The binocular infrared camera captures a face picture of a viewer and transmits the face picture to the image control module, the image control module analyzes and processes the face image, and then controls, based on an analysis result, the directional backlight module to light up LED light bars corresponding to the viewer.

Preferably, if the images are viewed only by a single viewer, the backlight unit only needs to light up and turn on a group of LED light bars corresponding to a pupil of the viewer, and each group of LED light bars includes a plurality of columns of light bars. If the images are viewed by N viewers, the backlight unit needs to light up and turn on N groups of LED light bars corresponding to pupils of the N viewers.

Preferably, when the backlight unit lights up and turns on a plurality of columns of LED light bar combinations to emit light beams, the emitted light beams are shaped into directional light beams through the light shaping film layer, and the half-height width of an image formed at a viewing position of the viewer is not greater than an interpupillary distance S of the viewer.

Compared with the prior art, the technical solutions of the present invention have the following beneficial effects.

The present invention provides a flicker-free directional backlight naked-eye 3D display device for multi-person viewing. The image control module converts image data into a 3D image in a corresponding format, and a parallax 3D image is output to a first or $N^{th}$ viewer through the cooperation of a display unit, a triangular prism-shaped microstructural directional beam-splitting film, and a directional backlight module. When a plurality of persons view the 3D images, a quantity of viewers is determined by a human eye position signal in a display area collected by a human eye tracking module. The directional backlight module only needs to correspondingly increase a quantity of backlight units to be turned on with the increase of the quantity of viewers, without the need for an additional optical device, thus simplifying the naked-eye 3D display device. The directional backlight module provides motion parallax, and the triangular prism-shaped microstructural directional beam-splitting film provides binocular parallax, so that the resolution is lost by only half in a horizontal direction and remains unchanged in a vertical direction, so that ultra HD 3D images can be implemented for one or more persons, and an LCD screen with a high-refresh rate is not required to perform parallax image display with time-division multiplexing, reducing a display data bandwidth and switching flicker, and implementing high-quality naked-eye 3D display with low crosstalk for multi-person viewing.

Figure 1:
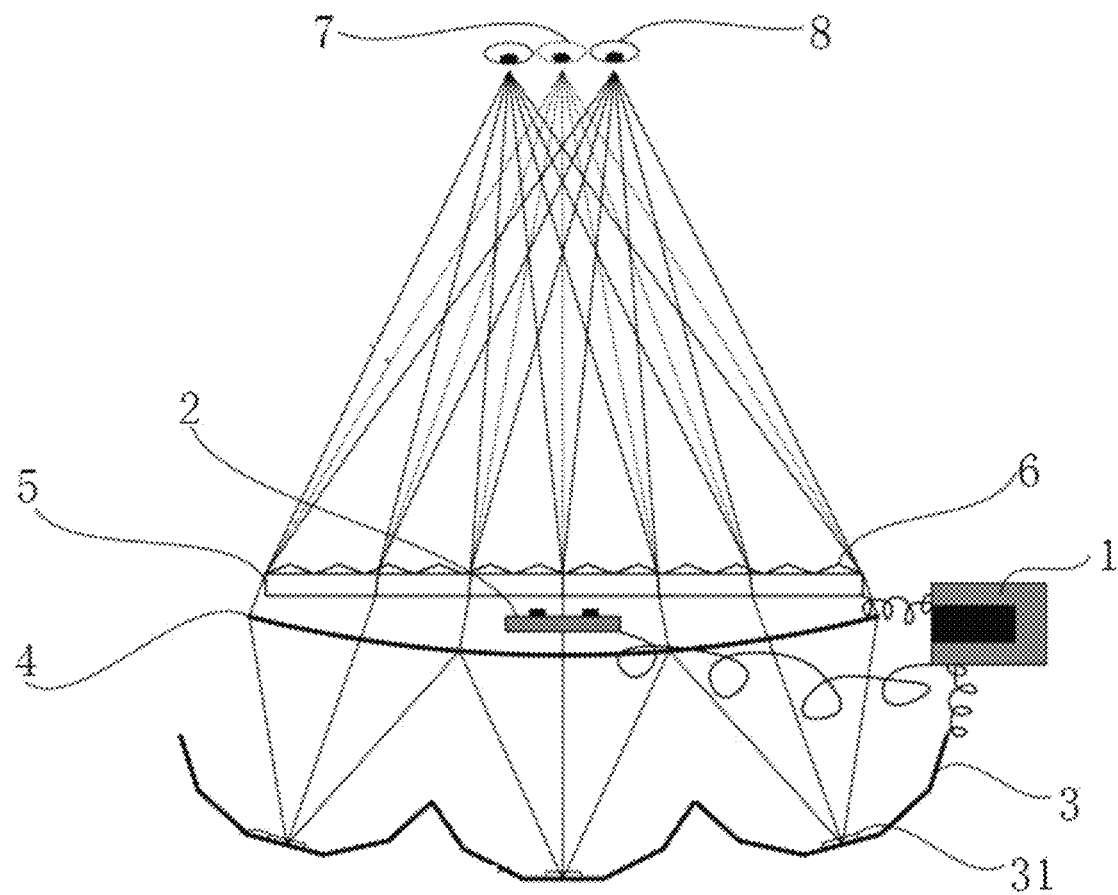
FIG. 1 is a schematic composition diagram of an integral structure of a flicker-free directional backlight naked-eye 3D display device for multi-person viewing according to an embodiment 1 of the present invention.

1. image control module; 2. human eye tracking module; 3. directional backlight module; 4. light shaping film layer; 5. display unit; 6. triangular prism-shaped microstructural directional beam-splitting film; 7. virtual human eye pupil; 8. human binocular pupils; 31. backlight unit; 204. left-eye display pixel; 203. right-eye display pixel; 301. first viewer; 302. second viewer; 303. second LED light bar combination; 304. first LED light bar combination.

DETAILED DESCRIPTION OF EMBODIMENTS

The accompanying drawings are for illustrative purposes only, and should not be construed as limiting the patent.

To better describe the embodiments, some parts of the accompanying drawings are omitted, enlarged, or reduced, and do not represent actual sizes.

For those skilled in the art, it should be understood that some descriptions of commonly known content in the drawings may be omitted.

Technical solutions of the present invention are further described with reference to the accompanying drawings and embodiments.

The description of the positional relationship in the accompanying drawings is for illustrative purposes only and cannot be construed as a limitation on the patent.

Embodiment 1

As shown in FIG. 1, this embodiment provides a flicker-free directional backlight naked-eye 3D display device for multi-person viewing. Refer to FIG. 1, the device includes: an image control module 1, a human eye tracking module 2, a directional backlight module 3, a light shaping film layer 4, a display unit 5, a triangular prism-shaped microstructural directional beam-splitting film 6. The triangular prism-shaped microstructural directional beam-splitting film 6 covers and is pasted on the display unit 5. The image control module 1 converts image data into a 3D image, and the image control module is connected to the directional backlight module 3, the human eye tracking module 2, and the display unit 5 respectively, extracts a human eye position signal collected by the human eye tracking module 2, synchronously sends the human eye position signal to the directional backlight module 3, and controls display output of the display unit 5.

Figure 2:
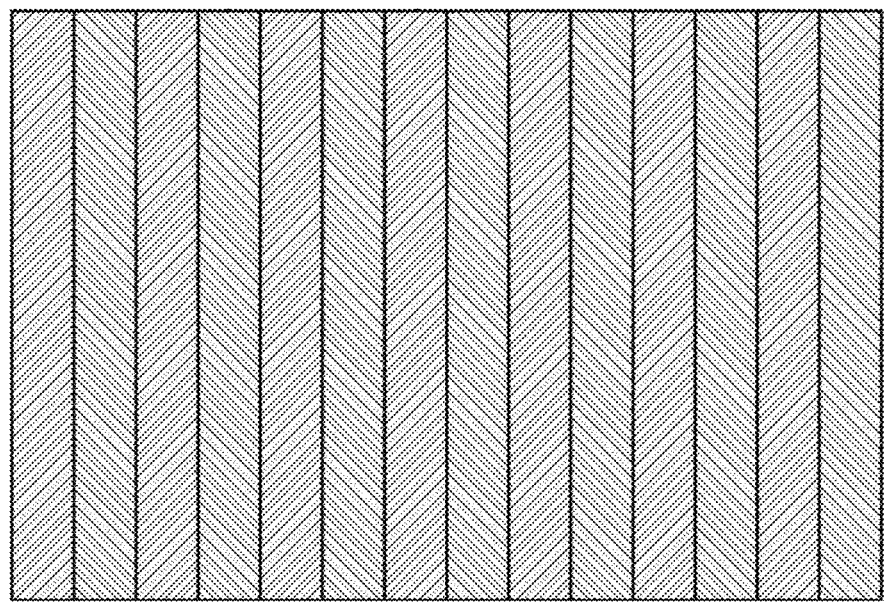
FIG. 2 is a schematic diagram in which an image control module converts image data into a 3D image according to the embodiment 1 of the present invention.
Figure 3:
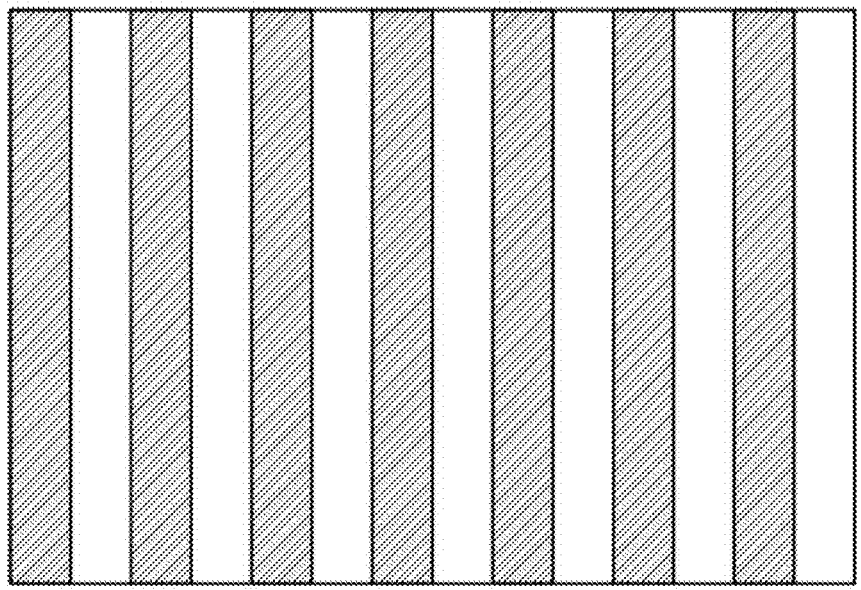
FIG. 3 is a schematic diagram of a left-eye parallax image represented by the 3D image in FIG. 2.
Figure 4:
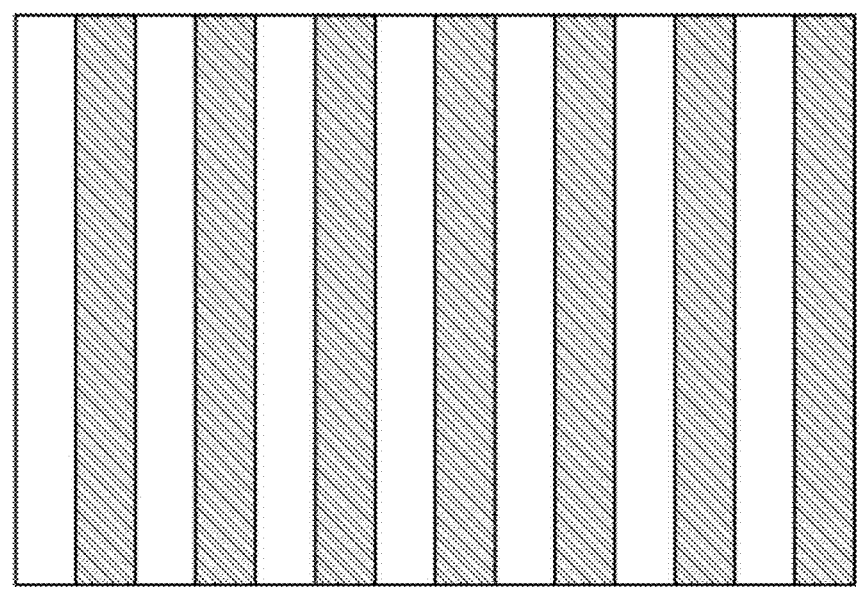
FIG. 4 is a schematic diagram of a right-eye parallax image represented by the 3D image in FIG. 2.

A schematic diagram in which the image data is converted into the 3D image by the image control module 1 is shown in FIG. 2. In practical implementation, the human eye tracking module 2 includes a binocular infrared camera and an infrared light supplementing light assisting the binocular infrared camera. The binocular infrared camera captures a face picture of a viewer and transmits the face picture to the image control module 1. After analyzing and processing the face picture, the image control module 1 controls the directional backlight module, according to the analysis result, to light up an LED light bar corresponding to the viewer. FIG. 3 is a left-eye parallax image represented by the 3D image, and FIG. 4 is a right-eye parallax image represented by the 3D image. The image control module controls a mixed image formed by superposing the left-eye parallax image and the right-eye parallax image to be displayed in the display unit. In this embodiment, the display unit 5 is an LCD panel, the 3D images displayed and output by the LCD panel are formed by interleaving and fusing odd columns and even columns of left-eye parallax images and right-eye parallax images. A screen refresh rate of the display unit is greater than or equal to 60 Hz. A mixed image display module composed of the triangular prism-shaped microstructural directional beam-splitting film 6 and the LCD panel replaces a traditional display screen with a high refresh rate that refreshes the left-eye parallax image and the right-eye parallax image alternatingly, resolving a time crosstalk problem produced during image refreshing.

Refer to FIG. 1. The directional backlight module 3 includes a plurality of backlight units 31 (four shown in FIG. 1). A light beam emitted by each backlight unit 31 is shaped into a directional light beam through the light shaping film layer 4, and the directional light beam loads an image through the display unit 5 and are split through the triangular prism-shaped microstructural directional beam-splitting film 6. The 3D images displayed by the display unit 5 include the left-eye parallax image and the right-eye parallax image, and the odd columns and the even columns respectively display the left-eye parallax images and the right-eye parallax images. The triangular prism-shaped microstructural directional beam-splitting film is composed of several triangular prism array units, each triangular prism array unit is corresponding to two columns of pixels and covers both a left-eye parallax image display pixel and a right-eye parallax image display pixel, and the 3D images displayed by the display unit are projected through the triangular prism-shaped microstructural directional beam-splitting film and then incident into left and right pupils of different viewers. In FIG. 1, a virtual human eye pupil 7 is located in the middle of human binocular pupils 8, a light beam emitted by a backlight unit 31 turned on by the directional backlight module 3 is also incident into the virtual human eye pupil, and the light beam emitted by the backlight unit 31 is shaped into a directional light beam through the light shaping film layer 4. The directional light beam loads an image through the display unit 5 and are split through the triangular prism-shaped microstructural directional beam-splitting film 6, and different parallax images on the left and right sides are accurately projected to the human binocular pupil 8, so that a viewer (one or more persons) can simultaneously view free 3D images with slight resolution loss at any angle without the assistance of an additional apparatus.

Embodiment 2

Figure 5:
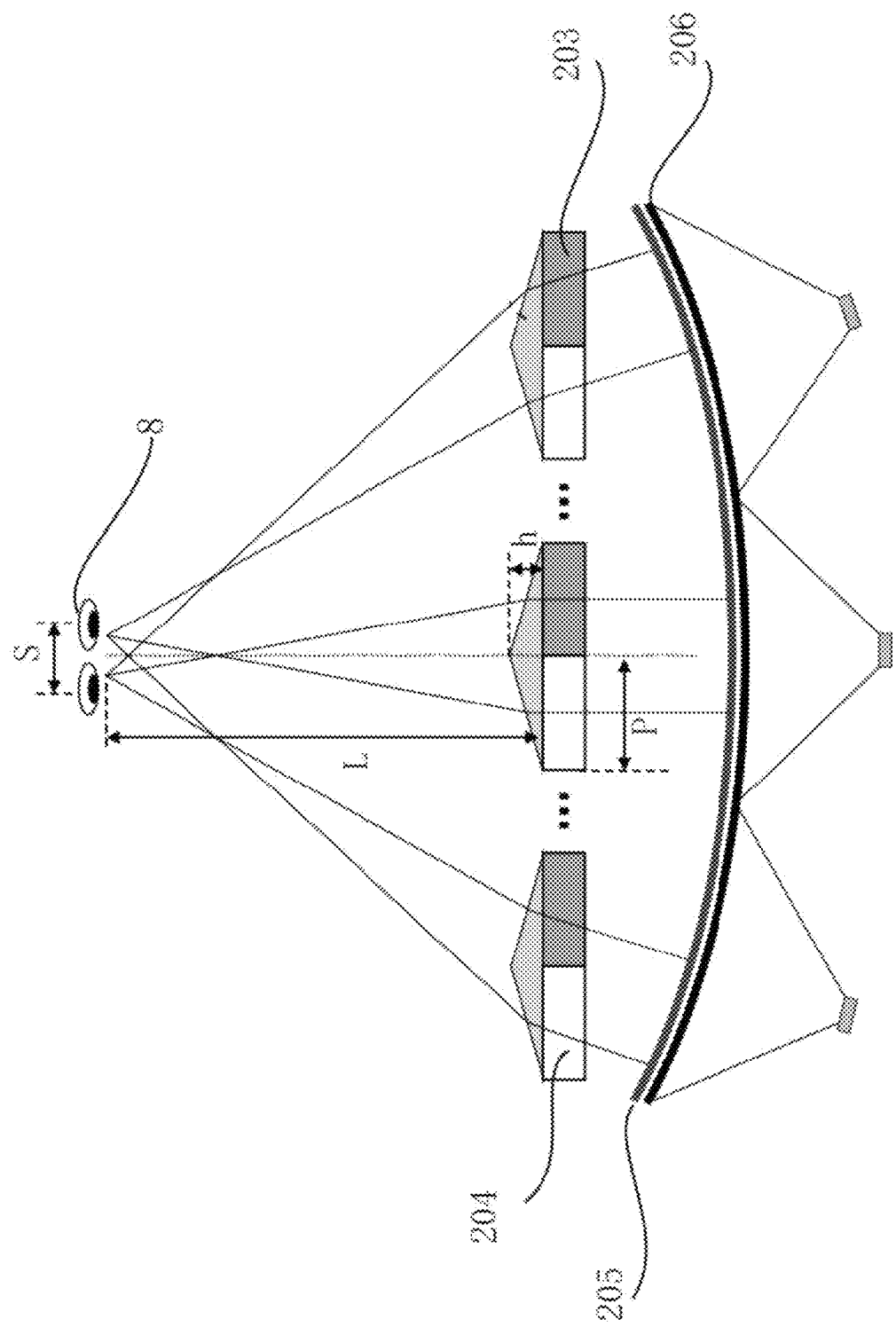
FIG. 5 is a schematic diagram of a geometric optical relationship among a triangular prism-shaped microstructural directional beam-splitting film, a display unit pixel, a viewer, and a viewing distance in a flicker-free directional backlight naked-eye 3D display device for multi-person viewing according to an embodiment 2 of the present invention.

FIG. 5 is a schematic diagram of a geometric optical relationship among a triangular prism-shaped microstructural directional beam-splitting film, a display unit pixel, a viewer, and a viewing distance in a flicker-free directional backlight naked-eye 3D display device for multi-person viewing. As shown in FIG. 5, it can be known that the triangular prism-shaped microstructural directional beam-splitting film 6 covers and is pasted on the LCD panel, the light shaping film layer 4 is composed of a lens array film 206 and a linear diffusion film 205, and a lens array of the lens array film 206 is a linear fresnel lens array, reducing resolution loss. As mentioned in the embodiment 1, the triangular prism-shaped microstructural directional beam-splitting film is composed of several triangle prism array units, each triangular prism array unit is corresponding to two columns of pixels. In other words, each triangular prism array unit covers two columns of pixels of the LCD panel, namely, a left-eye display pixel 204 and a right-eye display pixel 203. The left-eye display pixel 204 inputs a left-eye parallax image through the image control module 1, and the right-eye display pixel 203 inputs a right eye parallax image through the image control module 1 When the triangular prism-shaped microstructural directional beam-splitting film 6 is not used, the left-eye parallax image and the right-eye parallax image are projected together to a position of the virtual human eye pupil 7, and the parallax images are not allowed to be separated. After the triangular prism-shaped microstructural directional beam-splitting film 6 is added, the left-eye parallax image is deflected and projected to a left eye pupil through the triangular prism-shaped microstructural directional beam-splitting film 6, a right eye parallax image is deflected and projected to a right eye pupil through the triangular prism-shaped microstructural directional beam-splitting film 6, and a 3D image can be observed by a viewer through brain synthesis. Parameters of the triangular prism-shaped microstructural directional beam-splitting film 6 depend on overall parameters of the device. With reference to FIG. 5, the width of each pixel of the display unit is set to P, the section height of the triangular prism in the triangular prism-shaped microstructural directional beam-splitting film is set to h, an interpupillary distance of any one of a plurality of viewers is set to S, a refractive index of a material of the triangular prism is set to n1, and an optimal viewing distance is set to L, so that a geometrical optical relationship among the section height h of the triangular prism in the triangular prism-shaped microstructural directional beam-splitting film, the width P of each pixel of the display unit, the interpupillary distance S of any one of the plurality of viewers, and the optimal viewing distance L is as follows:

$$\arctan\left(\frac{L-\frac{h}{2}}{\frac{P+S}{2}}\right) - \arctan\left(\frac{h}{P}\right) = \frac{\pi}{2} - \arcsin\left[n1 \cdot \sin\left(\arctan\left(\frac{h}{P}\right)\right)\right].$$

Therefore, the section height h of the triangular prism shown in FIG. 5 can be calculated by setting P, S, L, and n1.

Embodiment 3

Figure 6:
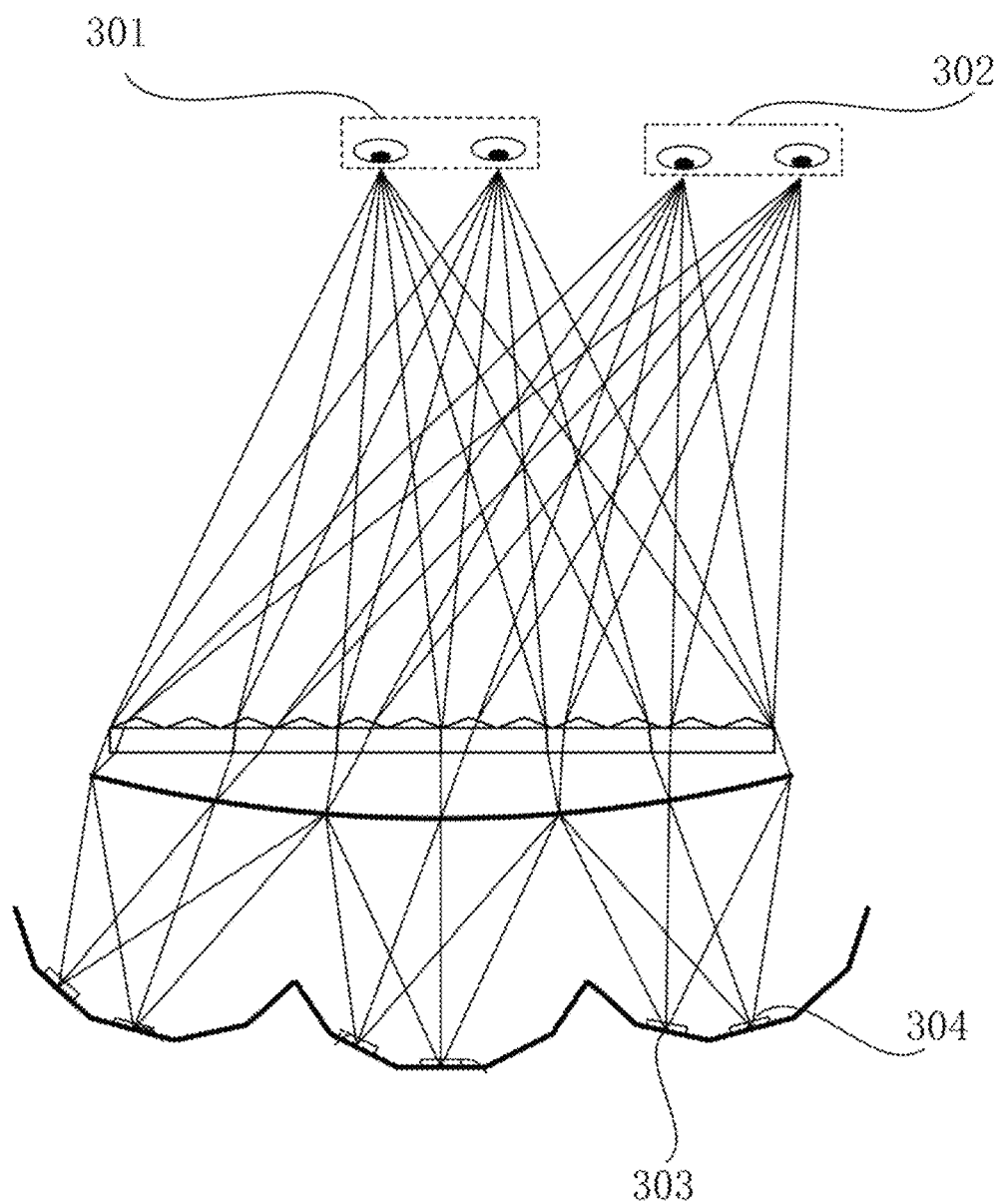
FIG. 6 is a schematic diagram of a naked-eye 3D display device for multi-person viewing in a 3D state according to an embodiment 3 of the present invention.

In this embodiment, FIG. 6 is a schematic diagram of a naked-eye 3D display device for multi-person viewing in a 3D state. Each backlight unit is composed of a plurality of LED light bars with different spacings from the light shaping film layer, the LED light bars are combined to form a polygonal structure, the polygon is formed by fitting a free curve of a focal plane of a lens unit, and an entire display area in which the viewer is located is illuminated by LED light bar combinations in different backlight units. It may refer to FIG. 6 for light transmission. The polygonal structure formed by the LED light bar combinations is more approximate to a real focal plane shape of a lens, and the entire display area in which the viewer is located is illuminated by the LED light bar combinations in different backlight units. When a quantity of viewers is increased, only the LED light bar combinations that are turned on in the backlight units needs to be increased and synchronously tracked, so that resolution loss is reduced, and generated crosstalk generated is also reduced when one or more persons experience.

The image control module 1 inputs a 3D image format formed by interleaving and fusing odd columns and even columns of left-eye parallax images and right-eye parallax images to the LCD panel, and the LED light bars on the backlight module are synchronously turned on. Under the action of the light shaping film layer 4, light emitted by a first LED light bar combination 304 is only projected to a first viewer 301, and the three-dimensional image displayed by the LCD panel is also loaded in a light beam. Under the action of the triangular prism-shaped microstructural directional beam-splitting film 6, the left-eye parallax images and the right-eye parallax images are respectively projected to a left eye pupil and a right eye pupil of the first viewer.

If the images are viewed only by one viewer, the backlight unit only needs light up and turn on a group of LED light bars corresponding to a pupil of the viewer, and each group of LED light bars includes a plurality of columns of light bars. If the images are viewed by N viewers, the backlight unit needs to light up and turn on N groups of LED light bars corresponding to pupils of the N viewers, where N is an integer and N≥2. Here, for one or N viewers, a face picture of a viewer is captured by the human eye tracking module 2 mentioned in the embodiment 1, and the face picture is transmitted to the image control module 1, the image control module 1 analyzes and processes the face picture to obtain an analysis result, the image control module 1 controls, based on the analysis result, the directional backlight module to light up the LED light bar corresponding to the viewer. When the backlight unit lights up and turns on a plurality of columns of LED light bar combinations to emit light beams, the emitted light beams are shaped into directional light beams through the light shaping film layer, and the half-height width of an image formed at a viewing position of the viewer is not greater than an interpupillary distance S of the viewer.

With reference to FIG. 6, specifically, light emitted by a second LED light bar combination 303 is only projected toward the second viewer 302, and a three-dimensional image displayed by the LCD panel is also loaded in the light beam. Under the action of the triangular prism-shaped microstructural directional beam-splitting film 6, a left-eye parallax image and a right-eye parallax image of the second viewer the same as those of the first viewer 304 are projected toward left-eye and right-eye pupils of the second viewer respectively, so that two persons can see a same 3D image simultaneously. In addition, since the polygonal backlight structure is more approximate to a real focal plane shape of the lens, and when viewers are increased, only a LED light bar combination in backlight unit needs to be increased and synchronously tracked, so that a traditional naked-eye 3D display device for multi-person viewing is simplified, and the resolution is not obviously reduced when two or more persons experience, and crosstalk is not obviously increased.

Obviously, the above embodiments of the present invention are only examples for clearly illustrating the present invention, and are not intended to limit the implementation of the present invention. For those skilled in the art, other different forms of changes or modifications can be made based on the above description. All implementations are not to be listed herein. Any modifications, equivalent substitutions, improvements, and the like made within the spirit and principle of the present invention should be included within the protection scope of the claims of the present invention.

What is claimed is:

1. A flicker-free directional backlight naked-eye three-dimensional (3D) display device for multi-person viewing, comprising: an image control module, a human eye tracking module, a directional backlight module, a light shaping film layer, a display unit, and a triangular prism-shaped microstructural directional beam-splitting film, wherein the triangular prism-shaped microstructural directional beam-splitting film covers and is pasted on the display unit, wherein the image control module converts image data into a 3D image, and the image control module is connected to the directional backlight module, the human eye tracking module, and the display unit respectively, extracts a human eye position signal collected by the human eye tracking module, synchronously sends the human eye position signal to the directional backlight module, and controls display output of the display unit, wherein the directional backlight module comprises several backlight units, a light beam emitted by each backlight unit is shaped into a directional light beam through the light shaping film layer, the directional light beam loads an image through the display unit and are split through the triangular prism-shaped microstructural directional beam-splitting film, wherein the 3D images displayed by the display unit comprise a left-eye parallax image and a right-eye parallax image, and odd columns and even columns of the display unit display the left-eye parallax image and the right-eye parallax image respectively, wherein the triangular prism-shaped microstructural directional beam-splitting film comprises several triangular prism array units, each triangular prism array unit is corresponding to two columns of pixels and covers both a left-eye parallax image display pixel and a right-eye parallax image display pixel, and the 3D images displayed by the display unit are projected through the triangular prism-shaped microstructural directional beam-splitting film and then incident into left and right pupils of different viewers, wherein the display unit is a liquid crystal display (LCD) panel, the 3D images displayed and output by the LCD panel is formed by interleaving and fusing odd columns and even columns of left-eye parallax images and right-eye parallax images, and a width of each pixel of the display unit is set to P, the section height of a triangular prism in the triangular prism-shaped microstructural directional beam-splitting film is set to h, an interpupillary distance of any one of a plurality of viewers is set to S, a refractive index of a material of the triangular prism is set to n1, and an optimal viewing distance is set to L, so that a geometrical optical relationship among the section height h of the triangular prism in the triangular prism-shaped microstructural directional beam-splitting film, the width P of each pixel of the display unit, the interpupillary distance S of any one of the plurality of viewers, and the optimal viewing distance L is as follows:

$$\arctan\left(\frac{L-\frac{h}{2}}{\frac{P+S}{2}}\right) - \arctan\left(\frac{h}{P}\right) = \frac{\pi}{2} - \arcsin\left[n1 \cdot \sin\left(\arctan\left(\frac{h}{P}\right)\right)\right].$$

2. The flicker-free directional backlight naked-eye 3D display device for multi-person viewing according to claim 1, wherein a screen refresh rate of the display unit is greater than or equal to 60 Hz.

3. The flicker-free directional backlight naked-eye 3D display device for multi-person viewing according to claim 1, wherein the light shaping film layer is composed of a lens array film and a linear diffusion film, and a lens array of the lens array film is a linear fresnel lens array.

4. The flicker-free directional backlight naked-eye 3D display device for multi-person viewing according to claim 1, wherein each backlight unit is composed of a plurality of light-emitting diode (LED) light bars with different spacings from the light shaping film layer, the LED light bars are combined to form a polygonal structure, the polygon is formed by fitting a free curve of a focal plane of a lens unit, and an entire display area in which the viewer is located is illuminated by LED light bar combinations in different backlight units.

5. The flicker-free directional backlight naked-eye 3D display device for multi-person viewing according to claim 4, wherein the human eye tracking module comprises a binocular infrared camera and an infrared light supplementing light assisting the binocular infrared camera, the binocular infrared camera captures a face picture of a viewer and transmits the face picture to the image control module, the image control module analyzes and processes the face image, and then controls, based on an analysis result, the directional backlight module to light up LED light bars corresponding to the viewer.

6. The flicker-free directional backlight naked-eye 3D display device for multi-person viewing according to claim 5, wherein if the images are viewed only by a single viewer, the backlight unit only needs to light up and turn on a group of LED light bars corresponding to a pupil of the viewer, and each group of LED light bars comprises a plurality of columns of light bars; if the images are viewed by N viewers, the backlight unit needs to light up and turn on N groups of LED light bars corresponding to pupils of the N viewers.

7. The flicker-free directional backlight naked-eye 3D display device for multi-person viewing according to claim 6, wherein when the backlight unit lights up and turns on a plurality of columns of LED light bar combinations to emit light beams, the emitted light beams are shaped into directional light beams through the light shaping film layer, and the half-height width of an image formed at a viewing position of the viewer is not greater than an interpupillary distance S of the viewer.

8. A flicker-free directional backlight naked-eye three-dimensional (3D) display device for multi-person viewing, comprising: an image control module, a human eye tracking module, a directional backlight module, a light shaping film layer, a display unit, and a triangular prism-shaped microstructural directional beam-splitting film, wherein the triangular prism-shaped microstructural directional beam-splitting film covers and is pasted on the display unit, wherein the image control module converts image data into a 3D image, and the image control module is connected to the directional backlight module, the human eye tracking module, and the display unit respectively, extracts a human eye position signal collected by the human eye tracking module, synchronously sends the human eye position signal to the directional backlight module, and controls display output of the display unit, wherein the directional backlight module comprises several backlight units, a light beam emitted by each backlight unit is shaped into a directional light beam through the light shaping film layer, the directional light beam loads an image through the display unit and are split through the triangular prism-shaped microstructural directional beam-splitting film, wherein the 3D images displayed by the display unit comprise a left-eye parallax image and a right-eye parallax image, and odd columns and even columns of the display unit display the left-eye parallax image and the right-eye parallax image respectively, wherein the triangular prism-shaped microstructural directional beam-splitting film comprises several triangular prism array units, each triangular prism array unit is corresponding to two columns of pixels and covers both a left-eye parallax image display pixel and a right-eye parallax image display pixel, and the 3D images displayed by the display unit are projected through the triangular prism-shaped microstructural directional beam-splitting film and then incident into left and right pupils of different viewers, wherein each backlight unit is composed of a plurality of light-emitting diode (LED) light bars with different spacings from the light shaping film layer, the LED light bars are combined to form a polygonal structure, the polygon is formed by fitting a free curve of a focal plane of a lens unit, and an entire display area in which the viewer is located is illuminated by LED light bar combinations in different backlight units, the human eye tracking module comprises a binocular infrared camera and an infrared light supplementing light assisting the binocular infrared camera, the binocular infrared camera captures a face picture of a viewer and transmits the face picture to the image control module, the image control module analyzes and processes the face image, and then controls, based on an analysis result, the directional backlight module to light up LED light bars corresponding to the viewer, if the images are viewed only by a single viewer, the backlight unit only needs to light up and turn on a group of LED light bars corresponding to a pupil of the viewer, and each group of LED light bars comprises a plurality of columns of light bars; if the images are viewed by N viewers, the backlight unit needs to light up and turn on N groups of LED light bars corresponding to pupils of the N viewers, and when the backlight unit lights up and turns on a plurality of columns of LED light bar combinations to emit light beams, the emitted light beams are shaped into directional light beams through the light shaping film layer, and the half-height width of an image formed at a viewing position of the viewer is not greater than an interpupillary distance S of the viewer.

\* \* \* \* \*